(12) United States Patent
Kim et al.

(10) Patent No.: US 8,009,876 B2
(45) Date of Patent: Aug. 30, 2011

(54) MULTI-SCALE VARIABLE DOMAIN DECOMPOSITION METHOD AND SYSTEM FOR IRIS IDENTIFICATION

(75) Inventors: Daehoon Kim, Seoul (KR); Nam-Sook Wee, Seoul (KR); Song-Hwa Kwon, Seoul (KR); Sung Jin Lee, Seoul (KR); Hyeong In Choi, Seoul (KR)

(73) Assignee: Iritech Inc., Herndon, VA (US)

( * ) Notice: Subject to any disclaimer, the term of this patent is extended or adjusted under 35 U.S.C. 154(b) by 1133 days.

(21) Appl. No.: 11/719,947

(22) PCT Filed: Sep. 13, 2005

(86) PCT No.: PCT/KR2005/003027
§ 371 (c)(1),
(2), (4) Date: May 22, 2007

(87) PCT Pub. No.: WO2006/054827
PCT Pub. Date: May 26, 2006

(65) Prior Publication Data
US 2009/0169064 A1    Jul. 2, 2009

(30) Foreign Application Priority Data
Nov. 22, 2004 (KR) .......... 10-2004-0096000

(51) Int. Cl.
*G06K 9/00* (2006.01)
(52) U.S. Cl. ........ 382/117; 382/195; 382/199; 345/468; 345/441; 345/681; 713/186

(58) Field of Classification Search ................ None
See application file for complete search history.

(56) References Cited

U.S. PATENT DOCUMENTS

| 5,291,560 | A  | * | 3/1994 | Daugman | 382/117 |
| 7,298,874 | B2 | * | 11/2007 | Cho | 382/118 |
| 2002/0039433 | A1 | * | 4/2002 | Shin | 382/117 |
| 2002/0154794 | A1 | * | 10/2002 | Cho | 382/117 |
| 2006/0147094 | A1 | * | 7/2006 | Yoo | 382/117 |
| 2006/0165266 | A1 | * | 7/2006 | Hamza | 382/117 |

OTHER PUBLICATIONS

World Intellectual Property Organization, Written Opinion of Search Authority for PCT/KR2005/003027.
World Intellectual Property Organization, International Preliminary Report on Patentability for PCT/KR2005/003027.
World Intellectual Property Organization, International Search Report for PCT/KR2005/003027.

* cited by examiner

*Primary Examiner* — John W Lee
(74) *Attorney, Agent, or Firm* — Intellectual Property Law Group LLP; Juneko Jackson (57) ABSTRACT

An iris identification method and system, which divide an iris image, which is acquired for personal identification, into a plurality of equal/unequal and multiscale regions, generate a corresponding code corresponding to the respective regions, organizing codes into a database, generate a code at the time of authentication in the same manner, and identify a person by comparing this code with the codes stored in the database, thus improving identification speed and rate.

20 Claims, 7 Drawing Sheets

[ registration ]     [ authentication ]

comparision     comparision comparision

Figure 13

[ registration ]     [ authentication]

comparision

Figure 14

MULTI-SCALE VARIABLE DOMAIN DECOMPOSITION METHOD AND SYSTEM FOR IRIS IDENTIFICATION

CROSS-REFERENCE TO RELATED APPLICATIONS

This application is a U.S. National Phase application, under 35 U.S.C. §371, of International Application PCT/KR2005/003027, with an international filing date of Sep. 13, 2005 and claims priority to Korean application no. 10-2004-0096000, filed Nov. 22, 2004; all of which are hereby incorporated by reference for all purposes.

BACKGROUND OF THE INVENTION

1. Field of the Invention

The present invention relates generally to an iris identification method and system for acquiring the image of an iris, comparing the image with previously registered information and identifying a person, and, more specifically, to an iris identification method and system, which decompose a person's iris image into a plurality of domains, extract iris code representing the characteristic feature(s) of the respective domains, and storing such iris code in a database, and then identify a person's identity by generating the iris code from the iris image of the person in question in the same way, and comparing this code with the codes stored in the database, thereby improving the speed and accuracy of iris identification.

2. Background Art

There is known a general processing method for identifying a person's identity using the iris, which consist of the following steps: in case of registration, they consist of detecting the iris from overall eye image, dividing iris into a suitably determined domains, generating iris code, storing the codes in a database; and in case of identification, generating the iris code of the person in question, searching the database for iris codes that are closest to the code at hand, and reaching the final decision based on the suitably chosen threshold value.

One of the methods of acquiring specific information from an iris region to perform such a processing method is disclosed in U.S. Pat. No. 5,291,560 filed by John G. Daugman.

Figure 1:
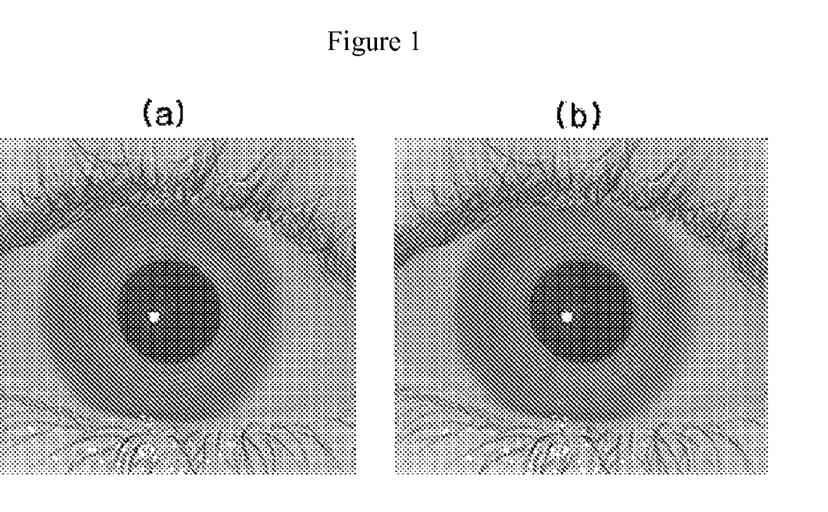
FIG. 1 illustrates the examples the division of iris region.

In the Daugman patent, a circle with which the boundary between an iris and a pupil is best approximated is searched for, the boundary between the iris and a sclera is approximated with a circle, and the region between these two circles is set to be an iris region. This annular region is further divided by a plurality of ring-like regions based on the equal proportion principle, as shown in FIG. 1(a). The iris code is generated from the each ring-like region by the use of the Gabor transform; this iris code is stored in a database. At the time of person's identification, the same procedures apply to the iris image of the person in question, and in particular, the iris code of the person question is generated. The identification procedure is such that a person in question is identical to a registered person if it is determined that the difference in information falls within a threshold value. However, this method may face a problem because a portion of the iris is typically covered by the eyelids or eyelashes, thereby producing an incorrect iris code that results from the image portion not belonging to the iris proper. This reduces the accuracy of the identification.

In order to cope with this contingency, the Daugman patent presents some remedy. It is based on the observation that the portions of the iris that are directly far above or below the pupil are more likely to be occluded by the eyelids or eyelashes. As a result, the Daugman patent proposes to cut out those portions from the ring-like regions and use the remaining ones. FIG. 1(b) shows the remaining usable portions of the ring-like regions. It then extracts iris code from those portions only. However, this method still has a drawback in that while such usable portions are preset in the a prior manner without regard to individual circumstances, the actual occlusion pattern in each image occurs in endless variety in reality, which means that portions presumed usable in the Daugman patent may very well be occluded in reality. It is clear that the occlusion patterns for the images of same individual differ every time the image is taken, and moreover due to a blink or impurities such as tear drops, the unoccluded iris region varies significantly. All these inaccuracies are likely to seep into the iris code, thereby reducing the accuracy of identification.

Another example of previously well known iris identification technology is disclosed in U.S. Pat. No. 6,247,813 previously filed and registered by some of the present applicants, in which the technology for calculating a plurality of identification parameters for iris identification based on the fiber structure of the iris, the reaction of the pupil and the Autonomous Nervous Wreath (ANW) to light, the shape of the ANW, and the location and shape of a lacuna from the iris image, and identifying a specific person based on the identification parameters is disclosed. The most important feature of this technology is a technique called the variable multi-sector method. In this method, the pupil and iris boundaries are represented by circles, and the region between these two circles is divided into multiple sectors using concentric circles and radial line segments, then suitable frequency transform, such as Haar Transform, is applied to each sectors to generate iris code to be used at the time of registration and identification. The most significant feature of this technology is the use of dynamically determining which sectors to discard and which sectors to use with regard to circumstances of the individual image. The discarded sectors are bad sectors that are occluded by eyelids, eyelashes, or some other impurities, and good ones are those free from such defects. This preceding patent then uses only remaining good sectors to generate iris code at the time of registration and identification. When comparing the two images (in fact codes), only those sector that are deemed to be good in both images (codes) are used in calculating the distance between the two. Therefore, a good sector used at the time of registration does not necessarily participate in the final calculation at the time of identification unless the same sector also turn out to be good in both images. This patent has advantages in that unpredictable contingencies concerning various occlusions that occur at the time of image capture can be efficiently dealt with and thus identification rate is considerably improved.

Figure 2:
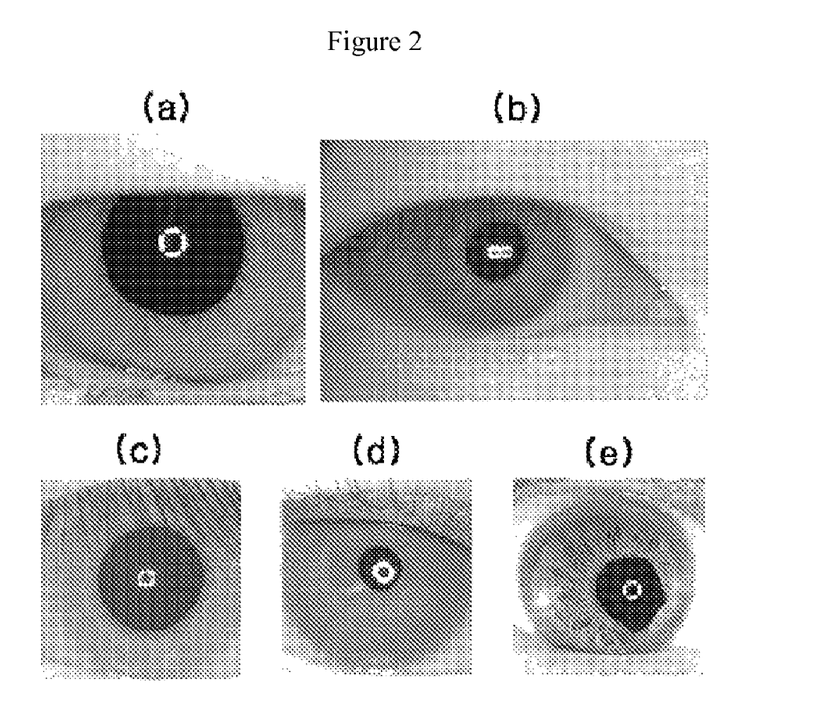
FIG. 2 shows image samples exemplifying the variety of the inner and boundaries of the pupil and iris.

However, this patent still has several drawbacks. That is, as shown in FIG. 2, there are many cases in which it is difficult to approximate humans' iris boundaries with circles, so that, when an iris boundary is approximated with a circle, a portion of the eye image other than the iris region is inevitably mistaken for the iris region and thus misused, thereby reducing the identification rate. Furthermore, it also has a disadvantage in that the sectors are constructed in a uniform and predetermined manner so that sectors that are only slightly covered with the eyelid or eyelashes must still be considered bad and thus be inevitably discarded, which makes it impossible to utilize the remaining good portion inside the bad, discarded sector.

Moreover, in the Daugman patent, when the iris region is extracted from the iris image captured by the camera, the inner boundary of the iris, which is the boundary between the pupil and the iris, the outer boundary of the iris, which is the boundary between the iris and the sclera, are treated as circles or ellipses for ease of data processing even though they are in reality closer to general curves, and the dividing lines for dividing the iris region into a plurality of sectors are treated as circles. These also put some limitation on the improvement of identification rate because such geometric characteristics cannot be fully utilized.

SUMMARY OF THE INVENTION

Technical Problem

The present invention is devised to overcome the above-described problems. The first objective of the present invention is to provide a method and system for identifying the iris, which do not approximate the inner and outer boundaries of the iris with circles, but reflect the actual shapes of the boundaries and approximate the boundaries using use general curves, thus improving identification accuracy. In the existing invention, the inner and outer boundaries of the iris are approximated with circles and the circles are used because they are easier to deal with even though the actual geometric character of the boundary may not actually be circular. For this reason, portions other than the iris region may be used to generate the iris code or some portions of the iris may be omitted in the generation of an iris code. Accordingly, these problems become hindrance to increasing the identification accuracy. To overcome these problems, the present invention presents a method of generating an iris code while reflecting the boundaries of the iris as they are. That is, the present invention attempts to provide the iris identification method and system that approximate the boundaries of the iris with general curves, not necessarily circles, so that the method and the system more accurately identify the iris region and generate an iris code, thereby improving the accuracy of iris identification.

A second objective of the present invention is to provide a method and system for identifying the iris that can utilize the maximal iris area so that personal identity information extracted therefrom will increase the accuracy of iris identification. There are many cases in which some of the iris images obtained for iris identification are of lower quality. There are many factors affecting such quality degradation: irregular shape of the eyes, occlusion by eyelids and eyelashes, reflection by tears, eyeglass, distortion by contact lenses, and various other anomalies that may occur at the time of image acquisition. When an iris code is generated using such low quality images, the accuracy of iris identification is naturally adversely affected. Accordingly, it is important to avoid the portion of the iris images that has lower quality, and use the better quality portion. For this reason, the existing Daugman patent attempts to alleviate the problem by predetermining the portion of iris less likely to be damaged and use those portions only. However, due to unpredictable nature of occlusion, such a priori determination is not possible. As a result, in Daugman method, some occluded portion of iris may be included in the generation of the iris code, while at the same time unoccluded good portion of iris may not be incorporated by a priori ground inherent in the Daugman patent. These also result in the degradation of the identification accuracy. In order to overcome these shortcomings, the preceding patent of some of the present applicants divides an iris region into several small sectors, dynamically determines whether each of the respective sectors is good enough to use, and select only those good ones for iris code generation and identification with regard to the circumstances of individual image. However, it still has the shortcomings in that the entire sector must be discarded, once it contains some portion which is bad, no matter how small the badly affected portion actually is. This reduces the totality of the good iris region that is available for iris identification. In other words, even if an extremely small portion of a sector is damaged, the entire sector must be discarded. To remedy such problems, that is, to maximize the use of the good region, the present invention presents the following new iris domain decomposition method and code generation method.

First, in order to introduce a versatile decomposition of the iris region, we utilize various mappings that map the iris region to a plane rectangular region. By such mapping, the iris region is first converted into a plane rectangular region. Second, the resulting rectangular region is decomposed into several small domains called unit sectors. A plurality of such decomposition schemes exists. In practice, it is possible to fix one of such schemes and utilize it, or it is also possible not to fix one and use a multitude decomposition schemes by selectively applying most appropriate scheme to each portion of the iris in order to maximize the usage of the good portion of iris. For example, when the rectangular region is decomposed into unit sectors, the portion of the iris that has bigger probability of being occluded by eyelids or eyelashes is divided into relatively small unit sectors and the portion that is less likely to be occluded is divided into relatively larger unit sectors. Through this method, the probability of salvaging the good portion of the iris can be increased, thereby increasing the accuracy of the identification. Moreover, this way, the size of the good portion can be made larger, thereby increasing the possibility of utilizing low frequency components which have more information content and are also more reliable.

In order to maximize the area of the iris region to be utilized for iris identification, a multi-scale method as well as the above-described variety of domain decomposition are used. When an iris code is generated through frequency transform of each unit sectors, it is in general more desirable to use as low frequency components as possible for increase the accuracy and the reliability of the iris code. However, as the size of unit sector becomes small, the number of low-frequency components that can be use is reduced. On the other hand, enlarging the size of unit sectors helps increase identification accuracy. For this purpose, the present invention employs the following multi-scale method: first, the iris codes are first generated via frequency transform on unit sectors and then the iris codes are also generated again via frequency transform on the bigger sectors which are formed by merging several unit sectors, and so on. The advantage of this multi-scale method is that it is possible to utilize as big a good portion of the iris as possible, while at the same time enlarging the size of the domain used in order to extract more low frequency components which are more meaningful and reliable for iris identification. Therefore, unlike the existing inventions, the present invention can increase the accuracy of identification by dynamically extracting the maximum information even when the iris image is damaged, thereby increasing the accuracy of identification.

In summary, the present invention provides an iris identification method and system that can compensate for the shortcomings of the existing invention by faithfully approximating the boundaries of an iris and introducing a new domain decomposition method to increase the accuracy of iris identification.

Technical Solution

In order to achieve the above described objectives, the present invention provides an iris identification method comprising iris code registration and iris identification, the iris code registration comprising the steps of acquiring iris images by capturing images using a camera or retrieving image files, generating iris codes from the acquired iris images, and storing the generated iris codes in a database, while the iris identification comprising the steps of acquiring an iris image in a manner identical to that of the iris code registration, generating an iris code from the acquired iris image, and identifying the generated iris code by comparing the generated iris code with the iris codes stored in the database, wherein:

the iris code generation step is performed in such a way as to determine inner and outer boundaries of an iris region by approximating the inner and outer boundaries with general curves based on actual shapes of the inner and outer boundaries, divide a part or all of a region between the inner and outer boundaries into one or more unit sectors, and generate an iris code corresponding to the respective sectors, and the iris code identification step is performed in such a way as to measure distances of the generated code to the existing codes stored in the database and determine whether each of the distances falls within a threshold value.

The present invention provides an iris identification system comprising iris code registration means and iris identification means, the iris code registration means comprising means for acquiring iris images captured by retrieving stored cameras or receiving image files, means for generating iris codes from the acquired iris images, and means for storing the generated iris codes in a database, while the iris identification means comprising means of acquiring an iris image in a manner identical to that of the iris code registration, means for generating an iris code from the acquired iris image, and means for identifying the generated iris code by comparing the generated iris code with the iris codes stored in the database, wherein:

the iris code generation means is performed in such a way as to determine inner and outer boundaries of an iris region by approximating the inner and outer boundaries with general curves based on actual shapes of the inner and outer boundaries, divide a part or all of a region between the inner and outer boundaries into one or more unit sectors, and generate an iris code corresponding to the respective sectors, and the iris code identification means is configured in such a way as to measure distances of the generated code to the existing codes stored in the database and determine whether each of the distances falls within a threshold value.

Advantageous Effects

The present invention distinguishes only an iris region from an iris image acquired from a target person, divides the iris region into a plurality of selected sections using an unequal or a multiscale method in conformity with the features of the target person, generates a code for personal identification from image signals for respective sections, and allows the code to be stored or used for personal identification, thereby precisely and rapidly performing personal identification through iris identification.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIGS. 12 and 13 are diagrams illustrating the method of comparing the two iris codes according to the present invention, wherein FIG. 12 shows the case in which all corresponding sectors are good, while FIG. 13 shows the case in which corresponding sectors are marked differently as good or bad so that only good ones are compared.

DESCRIPTION OF REFERENCE NUMERALS OF PRINCIPLE ELEMENTS

10-iris registration system,
11-iris image acquisition unit,
12-iris code generation unit,
13-iris code storage unit,
14-iris code database,
20-iris identification system,
21-iris image acquisition unit,
22-iris code generation unit,
23-iris code comparison unit,
24-identification unit

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

The construction and operation of preferred embodiments of the present invention are described in detail below with reference to the accompanying drawings.

Figure 3:
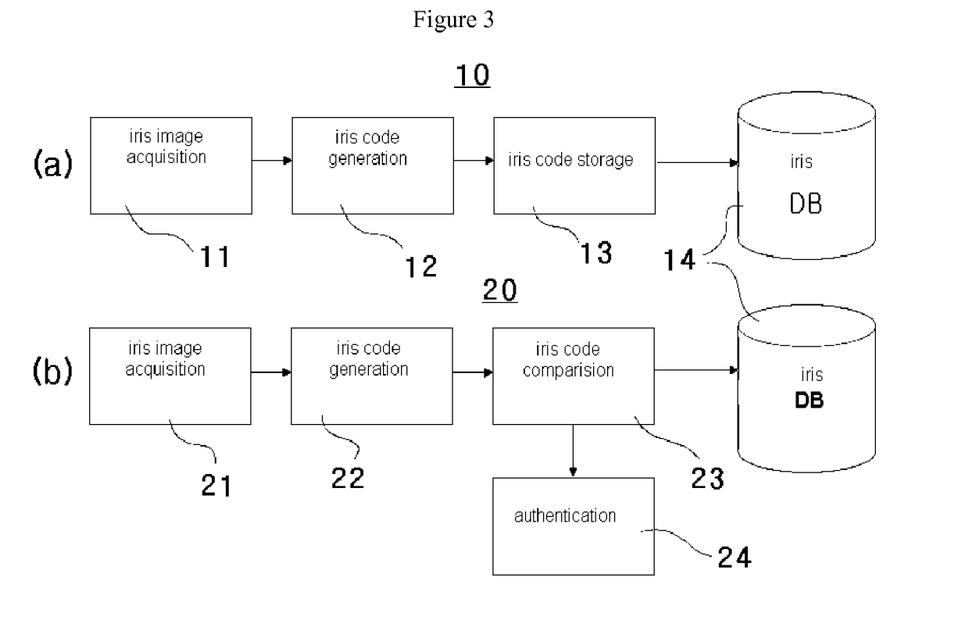
FIG. 3 is a schematic diagram of iris code registering and identification systems according to the present invention.

FIGS. 3(a) and 3(b) are schematic diagrams of an iris registration system and an iris identification system according to the present invention.

The iris registration system 10 includes an iris image acquisition unit 11 for acquiring an image of an iris region so as to generate an iris code to be registered, an iris code generation unit 12 for generating a code from the iris image acquired by the iris image acquisition unit 11, according to a code generation method that will be described later, and an iris code storage unit 13 for storing the iris code, which is generated by the iris code generation unit 12, in the iris database 14.

Furthermore, the iris identification system 20 includes an iris image acquisition unit 21 for acquiring an image of an iris region so as to generate an iris code to be identified, an iris code generation unit 22 for generating an iris code from the iris image, which is acquired by the iris image acquisition unit 21, according to a code generation method to be described later, an iris code comparison unit 23 for comparing the iris code, which is generated by the iris code generation unit 22, with iris codes, which are stored in an iris database 14, and an authentication unit 24 for outputting authentication results based on the comparison results of the iris code comparison unit 23.

When registration is performed in the above-described iris registration system 10, the iris image acquisition unit 11 captures an eye image and determines an iris region using a camera and HW/SW systems at the time of registration, a preprocessing process is undertaken, and the iris code generation unit 12 generates an iris template code and stores the code in the iris database 14. Furthermore, when identification is performed in the iris identification system 20 as in the registration, the iris image acquisition unit 21 captures an eye image and determines an iris region, a preprocessing process is undertaken, and the iris code generation unit 22 generates an iris template code and performs authentication by comparing the code with codes stored in the iris database 14. It is natural that the iris registration system 10 used at the time of registration and the iris identification system 20 used at the time of authentication do not need to be identical.

Meanwhile, with the standardization of iris image data format, raw iris images themselves are will be generally stored in a database. Accordingly, the need for a function of retrieve and register the raw iris images stored in the database. This signifies that, although an iris image stored in the database was at first taken using a camera, subsequent registration does not necessarily require a camera system. In the same vein, for real time identification, a camera must still be used, but identification utilizing the images stored in the database may also be a possibility in the future.

Accordingly, in the present invention, taking all these possibilities into account, the iris image acquisition unit 11 or 21 of the iris registration system 10 or the iris identification system 20 includes an iris image acquisition means that either uses a camera system, or acquires the images from a database or some storage medium. Although this is not described in detail here, it is a scheme that is well known to experts in iris identification technology.

We now describe how to process a given eye image to generate an iris code and how to improve identification accuracy in the present invention.

First, with reference to FIG. 4, a method of approximating the inner and outer boundaries of the iris using general curves is described in detail below. Methods of approximating boundaries with curves are classified into two types. One type is a method of approximating the boundaries using an appropriate parameterization method, and the other type is a method of performing approximation using curves without parameterization. Since the two methods have slight differences but can be fundamentally considered to be the same, only the method using parameterization is described here. However, even though the method of approximating boundaries with curves without parameterization is employed, the employment of the method does not depart from the scope of the present invention.

The inner boundary of the iris is the pupil boundary that is a curve between the pupil and the iris, and this curve is called $C_0(t)$. Here, t denotes the parameter of the curve and t ranges between a and b. In the prior art, this curve is usually assumed to have a specific shape, such as a circle, and a circle most approximate to the actual curve is calculated and used. However, as shown in FIG. 2, the actual geometric shape of the boundary can be varied significantly due to a variety of reasons such as disease, surgical operation or intrinsic defects. If such intrinsic variety is ignored and the boundary curves are uniformly assumed to be circles, error may occur.

Furthermore, the outer boundary of the iris is the curve that lies between the iris and the sclera, and we denote this curve by $C_1(t)$. Here, t refers to the parameter of the curve that ranges from a to b. In the prior art, this curve $C_1(t)$ is usually assumed to have a specific shape, just as boundary curve between iris and pupil $C_0(t)$, such as a circle, and a circle most approximate to the actual curve is calculated and used. However, as shown in FIG. 2, the actual geometric shape of the boundary $C_0(t)$ or $C_1(t)$ can be varied quite a lot due to a variety of reasons such as disease, surgical operation or intrinsic defects. If such intrinsic variety is ignored and the boundary curves are uniformly assumed to be circles, error may also occur. In particular, this error may cause the region that is not a part of an iris, such as the skin, pupil, sclera or eyelid, to be mistaken for a part of the iris, thus resulting in the degradation of accuracy. Accordingly, in the present invention, a general curve is used as the boundary curve so as to reduce error and improve the identification rate.

An example of a method of parameterizing a boundary with a general curve is described in detail below. In general, the trace of a curve (a set of points located on the curve) in a two-dimensional plane is represented as a zero set of an appropriate two-variable function $f(x,y)$, that is, $\{(x,y)|f(x,y)=0\}$, and the boundary curve of the iris is regarded as this zero set. The method of determining $f(x,y)$ is as follows: First search pixels that are estimated to lie on the boundary of the pupil or the iris using a signal processing technique and then estimate $f(x,y)$ from these pixel information by setting a function space finding the function whose zero set best approximates the selected pixels. This method can be realized through the projection method in Hilbert space, and is well known to experts. Furthermore, this method can be realized using the well known spline or regression analysis. Denote the function found as described above by $f_0(x,y)$. That is, the zero set of $f_0(x,y)$ is a curve that represents the boundary between the pupil and the iris (inner iris boundary) best. In the same manner, we find $f_1(x,y)$ that best represents the boundary curve (outer iris boundary) between the iris and the sclera.

Thereafter, the zero set of $f_0(x,y)$, which represents the inner boundary, and the zero set of $f_1(x,y)$, which represents the outer boundary, are parameterized using curves. In general, a curve in a two-dimensional plane is represented by the following equation:

$$C(t)=(x(t),y(t))\ a\geq t\geq b$$

There are many parameterization methods. For example, a polar coordinate system with angle t can be used. In this case, t ranges from 0 to $2\pi$.

The curve which is a parametrized curve of the zero set of $f_0(x,y)$ is called $C_0(t)$, and the curve which is a parametrized curve of the zero set of $f_1(x,y)$ is called $C_1(t)$. Although any such method including the polar coordinate system can be used, the use of any one of them does not alter the nature and the character of the present invention.

After the inner and outer boundaries of the iris have been approximated with the general curves as described above, mapping that transforms the region between the two boundaries, that is, the iris region, into a plane rectangular region is introduced irrespective of whether the parameterized or implicitly defined curve is used to approximate the boundaries. There are many ways of defining such mapping, several of which are described below.

In the case where the inner and outer boundaries of the iris are approximated with the zero set of $f_0(x,y)$ and the zero set of $f_1(x,y)$, respectively, we may assume that the inequality $f_0(x,y)<f_1(x,y)$ holds for every point (x,y) by using the condition that the inner boundary is located inside the outer boundary, and reversing inequality, if necessary. Then the iris region becomes the set of points in a plane denoted by $\{(x,y) | (1-u)f_0(x,y)+uf_1(x,y)=0$ for some u, $0 \leq u \leq 1\}$. This region is illustrated in FIG. 4. If $f_u(x,y)=(1-u)f_0(x,y)+uf_1(x,y)$, the dotted lines of the iris region in FIG. 4 correspond to the zero sets $f_{0.25}(x,y)=0$, $f_{0.5}(x,y)=0$ and $f_{0.75}(x,y)=0$, respectively. Likewise, the iris region can be represented as the collection of the zero sets of $f_u(x,y)=0$ while u ranges from 0 to 1, and such zero set is parameterized by $C_u(t)$ by using the above-described parameterization method. After such parameterization is established, the iris region, which is defined to be the region between the zero sets of $f_0$ and $f_1$, is mapped to a rectangle in plane (t,u). This kind of correspondence is the so-called mapping, which is a well known mathematical concept, and the above-described mapping is an example of such mapping, and any mapping method can be used.

The above-described $(1-u)f_0(x,y)+uf_1(x,y)$ is an example of a function that is defined in plane (x,y) with the parameter of u. The general form of such function is written in the form F(x,y,u), where F(x,y,u)=0 is a curve that represents the boundary between the pupil and the iris and F(x,y,1)=0 is a curve that represents the boundary between the iris and the sclera. For the value u between 0 and 1, F(x,y,u)=0 represents the curves between the two boundaries. When F(x,y,u)=0 represents different curves depending on u, the region of the iris can be defined as $\{(x,y)|F(x,y,u)=0$ for some $0 \leq u \geq 1\}$. Similarly, the curve defined by F(x,y,u)=0 can be reparametrized. Using this iris region can be mapped into a rectangle in a plane. The above-described $(1-u)f_0(x,y)+uf_1(x,y)$ is an example of F(x,y,u), and using any other form of F(x,y,u) does not alter the content or the scope of the present invention.

Another method of introducing mapping that maps the iris region to a planar rectangular region is as follows. In the case where the inner and outer boundaries of the iris are approximated with concentric circles, polar coordinate transform is simply used. In the case where the inner and outer boundaries are parameterized by $C_0(t)$ and $C_1(t)$, a mapping can be defined in such a way that the point which divides the line segment from $C_0(t)$ to $C_1(t)$ by the ratio u:1−u($0 \leq u \leq 1$) is mapped to the (t,u) in a plane. In this method, the inner boundary can be parametrized by $C_0(t)$ by measuring angle t from a fixed point, and the outer boundary can be parametrized by $C_1(t)$ by measuring angle t similarly. This is the same as composing the polar coordinate transform (θ, r) and the proportional transform (depending on θ) for r.

Figure 4:
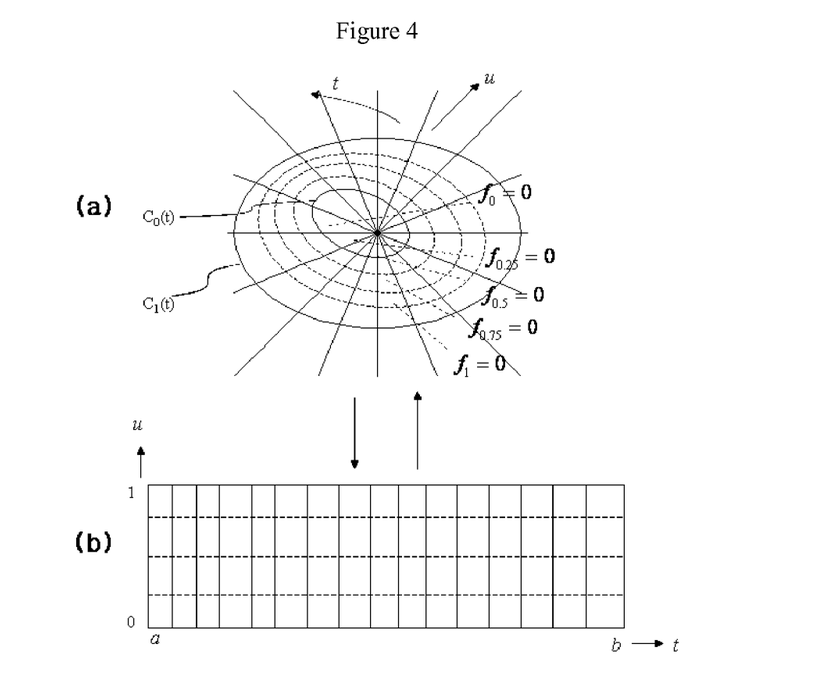
FIG. 4 is a diagram exemplifying a mapping relationship between an iris region and a rectangular region according to the present invention, the domain decomposition of the rectangular region, and the corresponding domain decomposition of the iris region.

When the mapping is defined in any way as described above, a rectangle in the (t,u) plane is divided as shown in FIG. 4(b), which in turn defines the division of the iris region. In the present invention, this method is referred to as the Domain Decomposition Method.

Figure 5:
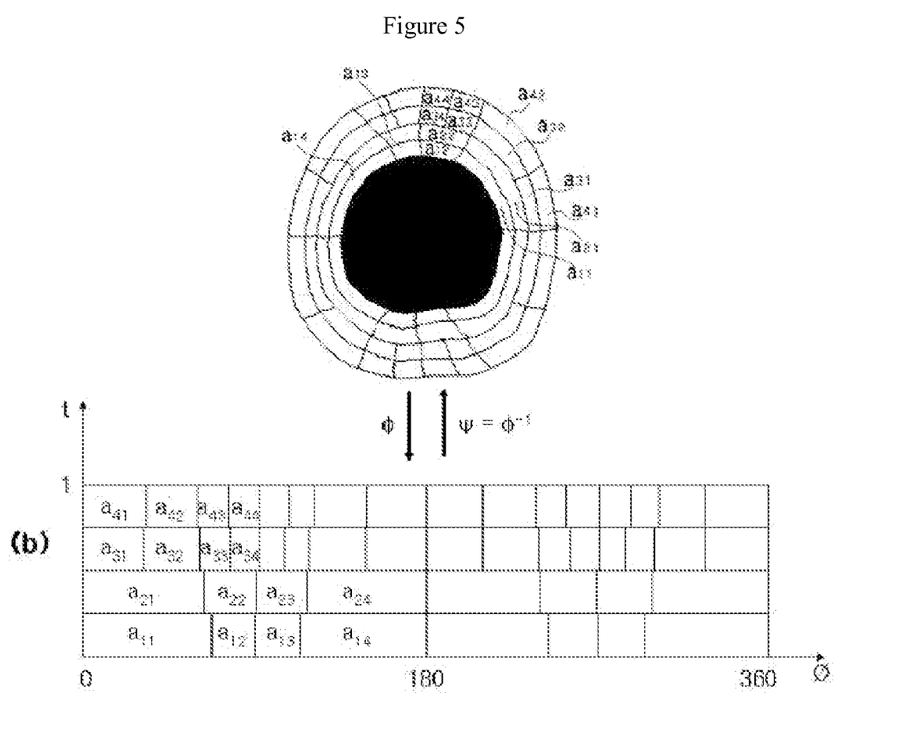
FIG. 5 is a diagram exemplifying the non-uniform domain decomposition of an iris region according to the present invention.
Figure 6:
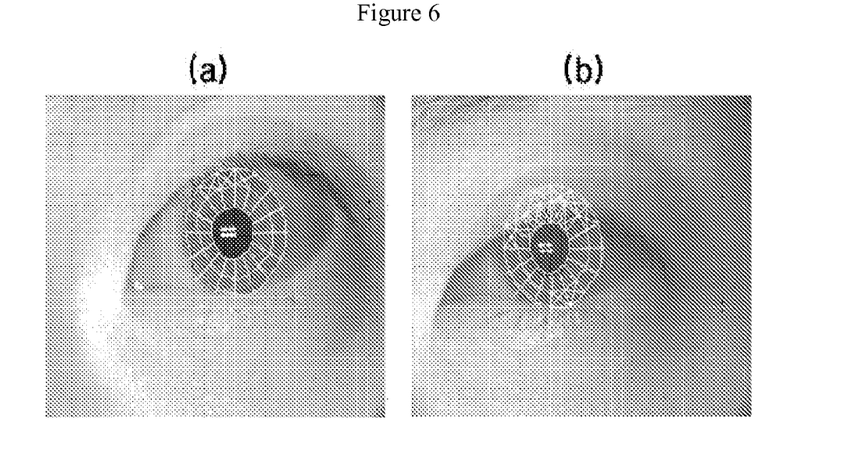
FIG. 6 is a diagram depicting the multi-sector method of a preceding patent of the present applicant in which bad sectors are marked with crosses.

FIGS. 5(a) and 5(b) show another example of domain decomposition in which the rectangle is divided according to the method shown in FIGS. 4(a) and 4(b). Here, Φ is the above-described mapping, and Ψ=Φ$^{-1}$ is the inverse mapping Φ. In FIG. 4(b), the domain of a rectangle is divided in an non-uniform manner, and each divided unit is referred to as the "unit sector." FIG. 5(a) shows how the inverse mapping Ψ matches each unit sector of the rectangle shown in FIG. 5(b) to corresponding unit sector of the iris region. In FIG. 5(b), unit sectors are designated by $a_{11}, a_{12}, a_{13}, a_{14}, \ldots$, and the corresponding unit sectors in the iris are marked in FIG. 5(a). The salient aspect of the domain decomposition of FIGS. 5(a) and 5(b) is that unit sectors corresponding to the upper and lower portions of the iris are set to be smaller and the side portions thereof are set to be larger. In order to explain the significance of this method, a preceding invention is examined as follows. FIG. 6 illustrates the sector decomposition according to the variable multi-sector method described in the patent previously issued to the present applicant, U.S. Pat. No. 6,247,813. In this patent, the iris region is divided into 36 uniform sectors. In FIG. 6(a), three sectors marked with 'X' are classified as bad sectors and excluded at the time of registration. FIG. 6(b) shows the iris at the time of identification. In this drawing, the iris is partially covered by the eyelid, so that many more sectors are excluded as bad sectors.

According to U.S. Pat. No. 6,247,813, only the sectors marked as good (no 'X' mark) in both in FIGS. 6(a) and 6(b) are used at the time of identification. However, as shown in FIG. 6(b), many sectors marked as bad are excluded even though they are only slightly occluded in reality. If the sectors located in the upper or lower portion of the iris were smaller than sectors in the center portion thereof, the regions of iris that are actually excluded would have been minimized, therefore the accuracy of iris identification would have increased. For this reason, the rate of iris identification can be increased using the non-uniform domain decomposition method that the present invention proposes. In this sense, the above-described non-uniform domain decomposition method of the present invention can contribute to the improvement of the accuracy of iris identification.

FIGS. 7 to 11 are diagrams illustrating the method of decomposing iris region into unit sectors, then, while excluding the bad unit sectors, merging them in the inverted tree data structure to form mid or large size to form mid- or large-size sectors, or domains.

When generating an iris code, a frequency transform technique is used for each unit sector. In general, low-frequency components are stable and help increase the identification accuracy. Accordingly, it is preferred that a unit sector be made as big as possible. However, in the case where unit sectors become bad due to the eyelid, the eyelashes, tears, reflection, etc., the entire unit sectors must be discarded. For this reason, it is not desirable to excessively increase the size of the unit sectors. The multiscale decomposition method proposed by the present invention has been devised to meet these two requirements.

Below, we illustrate our method in the uniform decomposition manner for ease of description. However, it is apparent to those skilled in the art that only trivial modification is needed to produce the non-uniform decomposition to take the above-described advantage.

Figure 7:
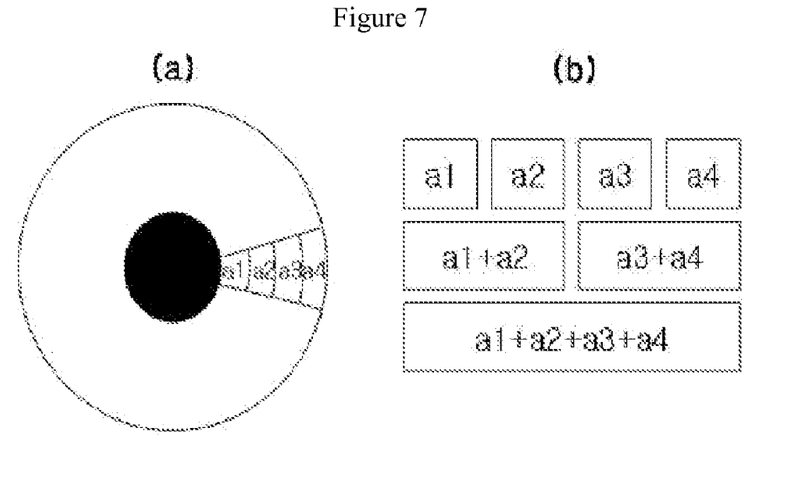
FIGS. 7 to 11 are diagrams illustrating a multi-scale domain decomposition method according to one embodiment of the present invention.

FIG. 7(a) shows an example of the multi-scale decomposition. Unit sectors indicated in the drawing are designated with $a_1, a_2, a_3$ and $a_4$. FIG. 7(b) shows an inverted tree structure that is used to merge the unit sectors into larger sectors.

The drawings show a data structure to produce the mid-size sector $a_1+a_2$ by merging the unit sectors $a_1$ and $a_2$ when the unit sectors $a_1$ and $a_2$ are good. In the same manner, the mid-size sector $a_3+a_4$ is formed when the unit sectors $a_3$ and $a_4$ are good; and then the large-size region $a_1+a_2+a_3+a_4$ is produced by merging the mid-size sectors $a_1+a_2$ and $a_3+a_4$.

Figure 8:
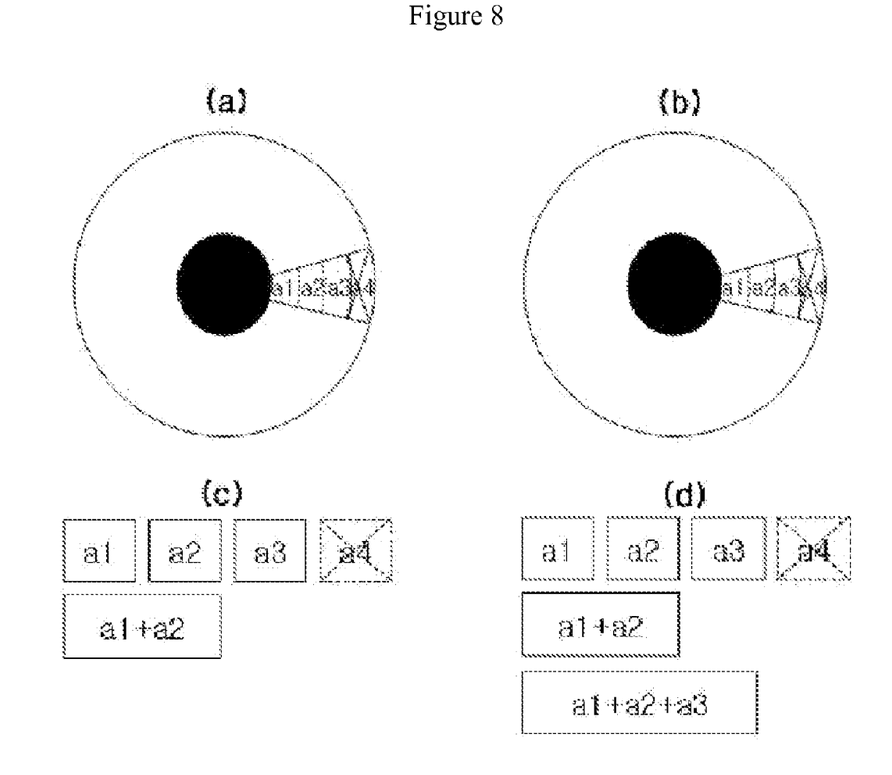

FIG. 8 is a drawing showing an example of another multi-scale decomposition according to the present invention. The drawing shows a case in which the unit sector $a_4$ is bad. As described in FIG. 7, the mid-size sector $a_1+a_2$ is produced by merging unit sectors $a_1$ and $a_2$, but it is impossible to merge unit sectors $a_3$ and $a_4$ because the unit sector $a_4$ is bad. As a result, the unit sectors are merged into two unequal sector $a_1+a_2$ and $a_3$, as shown in FIG. 8(b). It is also possible to produce another form of a mid-size sector $a_1+a_2+a_3$ by merging the unit divided blocks $a_1$, $a_2$ and $a_3$ as shown in FIG. 8(d).

Figure 9:
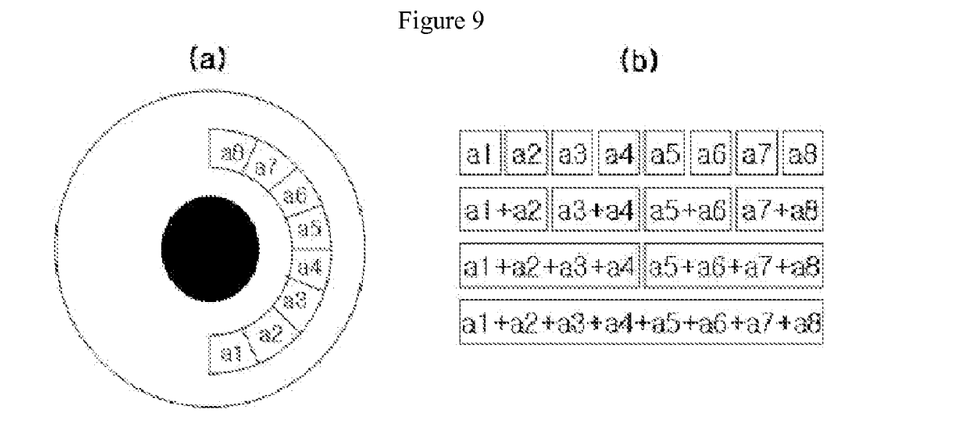
Figure 10:
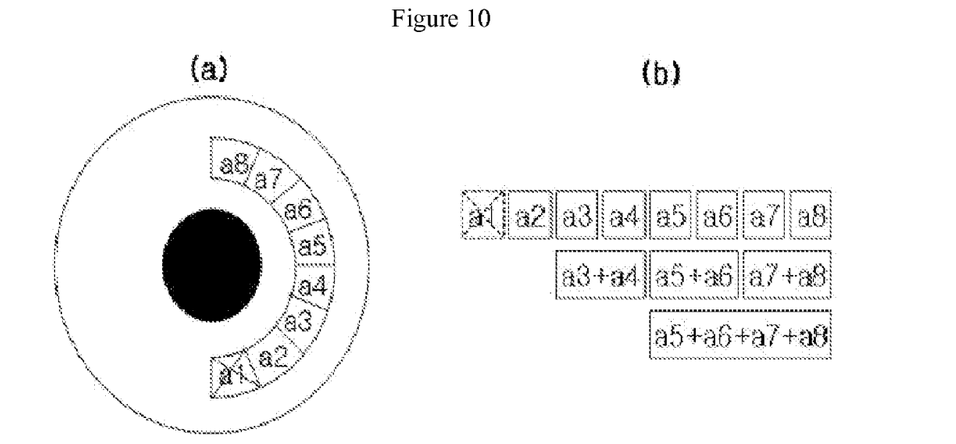

FIGS. 9 and 10 show cases in which, for example, eight unit sectors $a_1$ to $a_8$ for code generation are taken from arc formation. FIG. 9 illustrates a case in which none of the eight unit sectors is bad, and FIG. 10 illustrates a case in which one unit sector $a_1$ is bad.

FIG. 9(b) indicates how two smaller sectors are merged to form larger sectors, and two of these larger sectors are again merged to form an even larger sector, and so on in the successive manner.

FIG. 10(b) shows the same procedure as that in FIG. 9(b) except that one unit sector, $a_1$, is bad and is marked with 'X'. Accordingly the merged sectors to be produced in FIG. 9(b) cannot be formed if they are to contain $a_1$.

Figure 11:
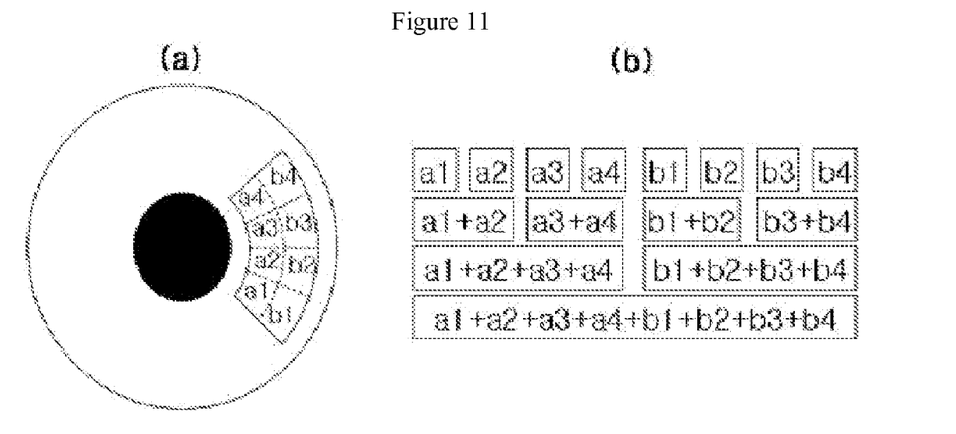

FIG. 11(b) is a diagram illustrating the multi-scale decomposition method in the case where, for example, four unit sectors $a_1$ to $a_4$ and four unit sectors $b_1$ to $b_4$ for code generation are arranged in arc form in two arrays. For example, in the case where none of the unit sectors is bad, not only individual unit sectors but also two or four unit sectors adjacent in each centric circle are set to form the mid-size and large-size sectors, and finally one huge sector is formed by merging them all. In case any one of the unit sector $a_1$ to $a_4$ and $b_1$ to $b_4$ turns out to be bad, the mid-, large-, or huge-sectors that contain those bad unit sectors should be discarded.

We now describe the process of generating the iris code and identifying the person using the above-described decomposition method. First, in the case where the multi-scale method is not used, coefficients in a frequency domain are generated by performing frequency transform, such as Haar transform, on unit sectors that are acquired using the uniform or non-uniform domain decomposition method. The coefficients generated as described above are combined using suitable weighting to produce an iris code to be stored at the time of registration; at the time of identification, these stored codes are compared to produce a certain distance such as Hamming distance between the two iris codes, and the identity of the person is determined by comparing this distance with the preset threshold value.

Figure 12:
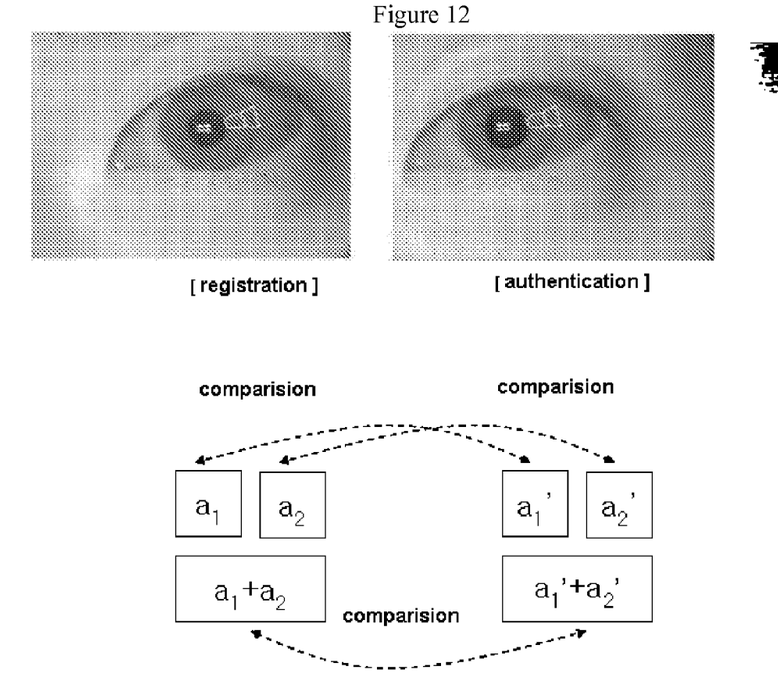
Figure 13:
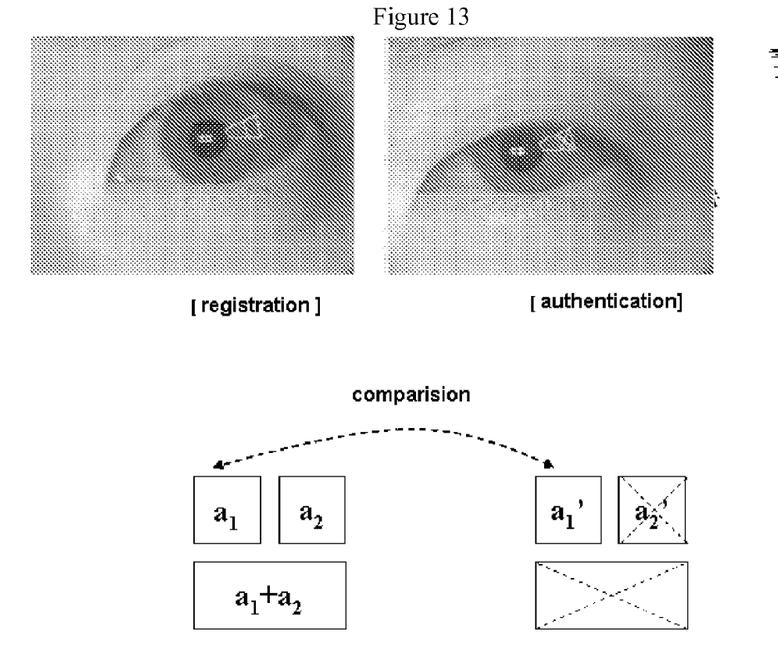
Figure 14:
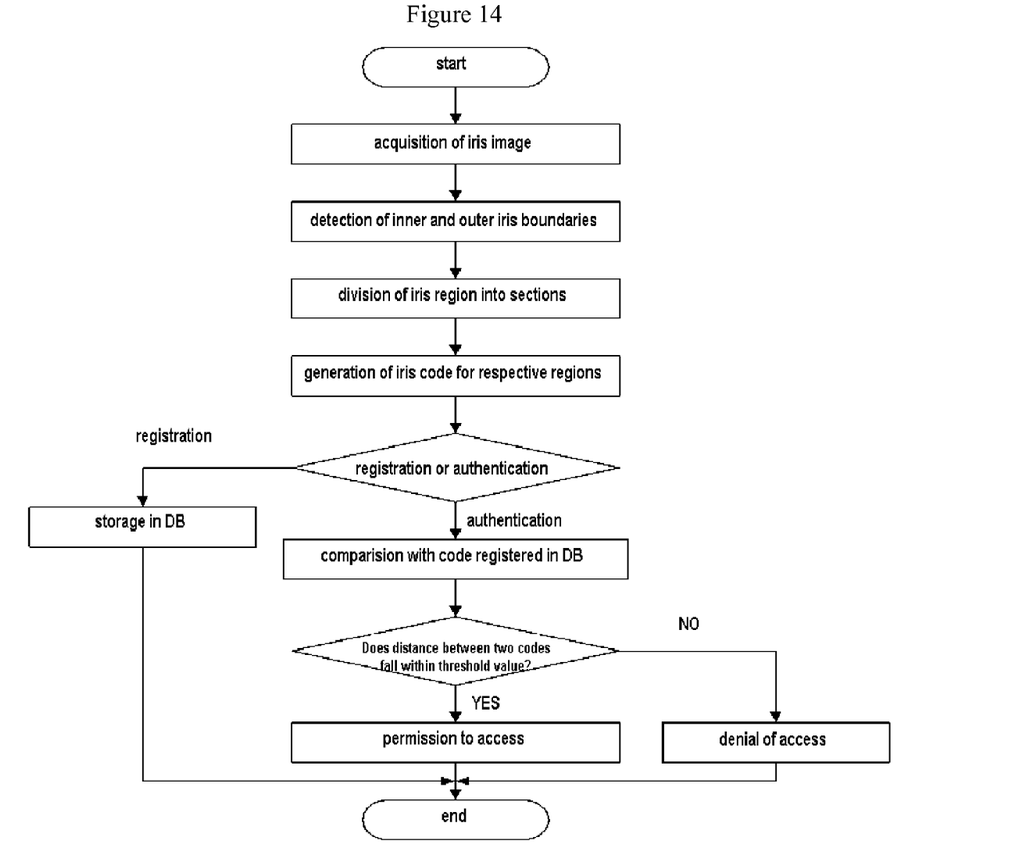
FIG. 14 is a flowchart illustrating an iris identification method according to the present invention.

Next, the procedure of the present invention using the multi-scale method is described below. FIGS. 12 and 13 are used to exemplify the cases where an iris region is divided according to the multi-scale method. First, FIG. 12 relates to the case where unit sectors $a_1$ and $a_2$ are good at the time of both registration and identification. In this case, not only the usual comparison of the code of $a_1$ with that of $a_{1'}$ and the code of $a_2$ with $a_{2'}$ is performed but also the code of the merged sector $a_1+a_2$ is compared with that of $a_{1'}+a_{2'}$. All these comparison results are combined with weights to produce the distance of the two codes (images) such as Hamming distance.

In contrast, FIG. 13 relates to the case where good and bad sectors are different at the time of registration and identification. This case is a case where sector $a_{2'}$ is determined to be bad, in which case not all registered sectors cannot be used. Accordingly, in this case, only $a_1$ and $a_{1'}$ are to be compared while the comparison between $a_2$ and $a_{2'}$ is not performed.

In the above-described embodiment, only some unit sectors are used to illustrate the present invention. However, it is obvious that in the actual practice the entire iris region has to be used, and it is obvious to those skilled in the art of iris identification that doing so is well with the scope of the present invention. It is also apparent to those skilled in this art that varying the number of unit sectors, the sizes, the location and the shape of the unit sectors is within the scope of the present invention.

As described above, the present invention employs the flexible method that maximally utilizes the good portions of the iris region, so that the present invention can considerably increase identification accuracy as compared to the conventional technology.

FIG. 13 is the flowchart illustrating the method of identifying the iris in accordance with the present invention.

First, in the case of iris code registration, the iris image acquisition unit 11 is operated and the target person's iris image is acquired. The acquisition of the iris image is performed by capturing the image with a camera, or by retrieving the image file from a database, or by receiving an image file from some other storage device.

Information such as inner and outer boundary of iris and other are extracted from the image and then the iris code is generated by the iris code generation unit 12.

Subsequently, as described above, the iris region is uniformly or non-uniformly divided into a plurality of sectors by fixing the above-described multi-scale domain decomposition method after the iris region is converted into a rectangle region in the plane, and then the iris code is generated using the frequency transform, most notably wavelet transform. Since the low frequency components represent better the characteristics of the iris fiber structure, suitably chosen low frequency components are stored as the iris code in a database. Meanwhile, in the case of iris identification the iris image of a target person is acquired by operating the iris image acquisition unit 21, the subsequent steps are performed in the iris code generation unit 22 as done in the case of iris code registration; the final determination is made by comparing both iris codes At the determination step, the distance such as Hamming distance between the registered code and the code of the person in question is computed and checked if it is within the predefined threshold value to conclude the identity of the person in question.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. An iris identification method comprising iris code registration and iris identification, the iris code registration comprising the steps of acquiring iris images by capturing images using a camera or retrieving stored image files, generating iris codes from the acquired iris images, and storing the generated iris codes in a database, while the iris identification comprising the steps of acquiring an iris image in a manner identical to that of the iris code registration, generating an iris code from the acquired iris image, and identifying the generated iris code by comparing the generated iris code with the iris codes stored in the database, wherein:

the iris code generation step is performed to determine inner and outer boundaries of an iris region by approximating the inner and outer boundaries with general curves based on actual shapes of the inner and outer boundaries, divide a part or all of a region between the inner and outer boundaries into one or more unit sectors, and generate an iris code corresponding to the respective sectors, wherein the iris code generation step comprises the steps of approximating the inner boundary of the iris with a zero set of $f_0(x, y)$, approximating the outer boundary of the iris with a zero set of $f_1(x, y)$, parameterizing the boundaries with $C_0(t)$ and $C_1(t)$, respectively, representing all points of the iris region with elements of a zero set of $F(x, y, u)=(1-u)f_0(x, y)+uf_1(x, y)$ for between 0 and 1, parameterizing a zero set of $F(x, y, u)$ with $C_u(t)$ for u, and transforming the iris region into the plane rectangular region using the parameter, and the iris code identification step is performed to measure distances of the generated code to the existing codes stored in the database and determine whether each of the distances falls within a threshold value.

2. The method as set forth in claim 1, wherein the iris code generation step comprises the steps of converting the iris region into a rectangular region using mapping that maps a part or all of the iris region to a plane rectangular region, dividing the rectangular region into one or more unit sectors, performing frequency transform on the respective unit sectors, and generating the code using frequency transform results.

3. The method as set forth in claim 1, wherein the iris code generation step comprises the steps of representing the part or all of the iris region with $\{(x,y)|F(x,y,u)=0 \text{ for some } 0\leq u\leq 1\}$ where $F(x,y,u)$ is a function defined in an $(x,y)$ plane having a parameter of u, in which a zero set of $F(x,y,0)$ represents the inner boundary of the iris, and a zero set of $F(x,y,1)$ represents the outer boundary of the iris, parameterizing $F(x,y,u)=0$ with a curve $C_u(t)$ for each $0\leq u\leq 1$ where $C_u(t)$ is a curve that parameterizes the zero set $F(x,y,u)=0$, mapping the iris region to the plane rectangular region using the parameter, dividing the plane rectangular region into the one or more unit sectors, performing frequency transform on the unit sectors, and generating the code using frequency transform results.

4. The method as set forth in claim 1, wherein the iris code generation step comprises the steps of approximating the inner and outer boundaries of the iris region with circles, and transforming the iris region into the plane rectangular region using polar coordinate transform.

5. The method as set forth in claim 1, wherein the iris code generation step comprises the steps of approximating the inner and outer boundaries of the iris with ellipses, performing transform so that major axes and minor axes thereof coincide with each other, transforming the iris region using proportional transform that transforms the two concentric ellipses, that is, the boundaries of the iris, into concentric circle and ellipse, extending a line that forms an angle t when $0°\leq t\leq 360°$ with a horizontal line, from a center of the resulting iris region, finding a point that internally divides an intersector point between the line and inner boundary and an intersector point between the line and the outer boundary by $u:1-u$ when $0\leq u'1$, and moving the found point to coordinate $(t,u)$ and transforming the iris region into a rectangular region.

6. The method as set forth in claim 1, wherein the iris code generation step comprises the steps of approximating the outer and inner boundaries of the iris with $C_0(t)$ and $C_1(t)$ when $a\leq t\leq g$), respectively, internally dividing $C_0(t)$ and $C_1(t)$ by $u:1-u$ when $0\leq u\leq 1$, and performing transform on a $(t,u)$ coordinate system.

7. The method as set forth in claim 2 wherein the iris code generation step is performed that shapes and sizes of one or more unit sectors are not identical when the rectangular region is divided into the unit sectors after the iris region has been transformed into the rectangular region.

8. The method as set forth in claim 2, wherein the iris code generation step is performed that large-size division is performed near a location corresponding to the inner boundary of the iris and small-size division is performed near a location corresponding to the outer boundary of the iris when the rectangular region is divided into the unit sectors after the iris region has been transformed into the rectangular region.

9. The method as set forth in claim 2, wherein the iris code generation step comprises the steps of merging the unit sectors into a middle-size or one or more large-size sectors, and generating the code by applying frequency transform to the one or more merged sectors.

10. The method as set forth in claim 2, wherein the iris code generation step is performed so that the code is formed only for good sectors, including unit sectors, middle-size sectors or large-size sectors.

11. The method as set forth in claim 10, wherein the iris code identification step is performed to measure distances to previously stored codes using only the code generated only from the good code at the iris code generation step.

12. The method as set forth in claim 2, wherein the iris code generation step is performed that the mapping that maps the part or all of the iris region to the plane rectangular region or the method that divides the rectangular region is not uniformly applied to every image.

13. The method as set forth in claim 2, wherein the iris code generation step is performed that the mapping that maps the part or all of the iris region to the plane rectangular region is not unique, so that a plurality of the mapping can be utilized.

14. The method as set forth in claim 2, wherein the iris code identification step is performed to set different degrees of contribution for respective sectors when measuring distances based on the iris code generated from the sectors.

15. An iris identification system comprising iris code registration means and iris identification means, the iris code registration means comprising means for acquiring iris images by capturing images using a camera or retrieving stored image files, means for generating iris codes from the acquired iris images, and means for storing the generated iris codes in a database, while the iris identification means comprising means of acquiring an iris image in a manner identical to that of the iris code registration, means for generating an iris code from the acquired iris image, and means for identifying the generated iris code by comparing the generated iris code with the iris codes stored in the database, wherein:

the iris code generation means is performed to determine inner and outer boundaries of an iris region by approximating the inner and outer boundaries with general curves based on actual shapes of the inner and outer boundaries, divide a part or all of a region between the inner and outer boundaries into one or more unit sectors, and generate an iris code corresponding to the respective sectors, wherein the iris code generation means comprises means for approximating the inner boundary of the iris with a zero set of $f_0(x, y)$, approximating the outer boundary of the iris with a zero set of $f_1(x, y)$, parameterizing the boundaries with $C_0(t)$ and $C_1(t)$, respectively, representing all points of the iris region with elements of a zero set of $F(x, y, u)=(1-u)f_0(x, y)+uf_1$ (x, y) for between 0 and 1, parameterizing a zero set of $F(x, y, u)$ with $C_u(t)$ for u, and transforming the iris region into the plane rectangular region using the parameter, and the iris code identification means is configured to measure distances of the generated code to the existing codes stored in the database and determine whether each of the distances falls within a threshold value.

16. The system as set forth in claim 15, wherein the iris code generation means is configured to convert the iris region into a rectangular region using mapping that maps a part or all of the iris region to a plane rectangular region, divide the rectangular region into one or more unit sectors, perform frequency transform on the respective unit sectors, and generate the code using frequency transform results.

17. The system as set forth in claim 15, wherein the iris code generation means is configured to represent the part or all of the iris region with $\{(x,y)|F(x,y,u)=0 \text{ for some } 0\leq u\leq 1\}$ where $F(x,y,u)$ is a function defined in an (x,y) plane having a parameter u, in which a zero set of $F(x,y,0)$ represents the inner boundary of the iris and a zero set of $F(x,y,1)$ represents the outer boundary of the iris, parameterize $F(x,y,u)=0$ with a curve $C_u(t)$ for $0\leq u\leq 1$ where $C_u(t)$ is a curve that parameterizes the zero set $F(x,y,u)=0$, map the iris region to the plane rectangular region using the parameter, divide the plane rectangular region into the one or more unit sectors, perform frequency transform on the unit sectors, and generate the code using frequency transform results.

18. The system as set forth in claim 15, wherein the iris code generation means comprises means for approximating the inner and outer boundaries of the iris region with circles, and transforming the iris region into the plane rectangular region using polar coordinate transform.

19. The system as set forth in claim 15, wherein the iris code generation means comprises means for approximating the inner and outer boundaries of the iris with ellipses, performing transform so that major axes and minor axes thereof coincide with each other, transforming the iris region using proportional transform that transforms the two concentric ellipses, that is, the boundaries of the iris, into concentric circle and ellipse, extending a line that forms an angle t when $0°\leq t\leq 360°$ with a horizontal line, from a center of the resulting iris region, finding a point that internally divides an intersector point between the line and inner boundary and an intersector point between the line and the outer boundary by u:1−u when $0\leq u\leq 1$, and moving the found point to coordinate (t,u) and transforming the iris region into a rectangular region.

20. The system as set forth in claim 15, wherein the iris code generation means comprises means for approximating the outer and inner boundaries of the iris with $C_0(t)$ and $C_1(t)$ when $a\leq t\leq b$, respectively, internally dividing $C_0(t)$ and $C_1(t)$ by u:1−u when $0\leq u\leq 1$, and performing transform on a (t,u) coordinate system.

* * * * *